US008724888B2

(12) United States Patent
Hsu et al.

(10) Patent No.: US 8,724,888 B2
(45) Date of Patent: May 13, 2014

(54) STEREO VISION BASED DICE RECOGNITION SYSTEM AND STEREO VISION BASED DICE RECOGNITION METHOD FOR UNCONTROLLED ENVIRONMENTS

(75) Inventors: Gee-Sern Hsu, Taipei (TW); Xun-Jia Zhang, Taipei County (TW)

(73) Assignee: National Taiwan University of Science and Technology, Taipei (TW)

( * ) Notice: Subject to any disclaimer, the term of this patent is extended or adjusted under 35 U.S.C. 154(b) by 361 days.

(21) Appl. No.: 13/118,559

(22) Filed: May 30, 2011

(65) Prior Publication Data

US 2012/0106831 A1    May 3, 2012

(30) Foreign Application Priority Data

Oct. 27, 2010   (TW) ................................ 99136767 A

(51) Int. Cl.
*G06K 9/00* (2006.01)
*A63F 9/04* (2006.01)

(52) U.S. Cl.
USPC ............................. 382/154; 382/100; 273/146

(58) Field of Classification Search
CPC ................... G06T 7/0075; G06T 2207/10012; G06K 9/00624; G06K 9/6218; G06K 2209/01; G06K 9/6212; H04N 13/0239; A63F 9/0415; A63F 9/04
USPC ......... 382/154, 107, 291, 100, 276, 286, 162, 382/173, 168, 181, 190, 210, 232, 254, 382/312; 273/146, 145; 370/394; 345/20, 345/63, 581–618, 690–697
See application file for complete search history.

(56) References Cited

U.S. PATENT DOCUMENTS

| 7,360,762 B2 * | 4/2008 | Itagaki et al. ................. 273/146 |
| 8,216,057 B2 * | 7/2012 | Yoshihara ........................ 463/22 |
| 8,351,701 B2 * | 1/2013 | Lai et al. ....................... 382/182 |
| 2009/0263008 A1 | 10/2009 | Lai et al. |

FOREIGN PATENT DOCUMENTS

| TW | 200526307 | 8/2005 |
| TW | I251505 | 3/2006 |
| TW | I272962 | 2/2007 |
| TW | 200730228 | 8/2007 |
| TW | 200915192 | 4/2009 |
| TW | M364920 | 9/2009 |
| TW | M368475 | 11/2009 |
| TW | 201032149 | 9/2010 |

OTHER PUBLICATIONS

"Office Action of Taiwan Counterpart Application", issued on Jun. 27, 2013, p. 1-p. 7, in which the listed references were cited.

* cited by examiner

*Primary Examiner* — Sheela Chawan
(74) *Attorney, Agent, or Firm* — Jianq Chyun IP Office

(57) ABSTRACT

A dice recognition system and a dice recognition method for uncontrolled environments are provided. In the present invention, the number of dot on a dice is automatically recognized in an uncontrolled environment by using multiple cameras. The present dice recognition system is different in at least two aspects from any existing automatic dice recognition system which uses a single camera for recognizing dice in an enclosed environment. Firstly, an existing automatic dice recognition system uses a single camera to obtain planar images for dice recognition, while the present dice recognition system uses multiple cameras to obtain different viewpoints images for dice recognition. Secondly, the present dice recognition system is designed for uncontrolled environments, and which can be applied to an open-table game in a general gambling place for dice recognition without changing the original dice, dice cup, and other related objects.

9 Claims, 6 Drawing Sheets

US 8,724,888 B2

STEREO VISION BASED DICE RECOGNITION SYSTEM AND STEREO VISION BASED DICE RECOGNITION METHOD FOR UNCONTROLLED ENVIRONMENTS

CROSS-REFERENCE TO RELATED APPLICATION

This application claims the priority benefit of Taiwan application serial no. 99136767, filed Oct. 27, 2010. The entirety of the above-mentioned patent application is hereby incorporated by reference herein and made a part of this specification.

BACKGROUND OF THE INVENTION

1. Field of the Invention

The present invention generally relates to a dice recognition system using computer vision technology, and more particularly, to a dice recognition system that recognizes the number of dot on a dice using multiple image capturing devices in an uncontrolled environment.

2. Description of Related Art

Common dice games are played on game tables, where the banker rolls the dice and multiple players place their bets before the banker reveal the dice's outcomes. This interaction between the players and the banker has been taken place in an open and uncontrolled environment for decades and will keep the same in the future.

In recent years, computer-controlled automatic dice game systems are emerging to the market. The system is composed of various hardware components and a dice recognition software, which work together to roll the dice, open the dice cup and recognize the outcomes automatically. The core part of this technology is the dice recognition software that implements computer vision algorithms to identify the number of dot on each dice from images captured by a monocular camera.

Open-table dice games are much more popular than automatic dice game systems because most players are more familiar and comfortable with open-table games than computer-controlled closed systems. It would be advantageous if automatic recognition of the dice can perform on regular game tables. For example, virtual bankers can be made to replace human bankers for offering the services at each game table. Or the automatic dice recognition can help human bankers double-check the computer recognizing number, count and collect won and loss wagers, and minimize possible mistakes and frauds. Various automatic open-table games can also be designed.

All existing automatic dice recognition systems are closed systems. The recognition software can only work for that specific closed system, and cannot be applied to common open table games. The major cause of this limitation is that the algorithm in the recognition software is designed for the dot images taken from the top view, under predefined illumination conditions, in that specific closed environment. None of these parameters and their ranges remains the same in open table games, and the algorithm does not work for different ranges of the parameters.

In order to design a system for the recognition of dice in uncontrolled open table games, the present invention proposes a system to integrate the appearances of the dice captured by cameras of different viewpoints, and characterize the coplanar features on the dice. The proposed system exploits color components, artificial neural networks, and stereo vision technology to come up with an algorithm robust to illumination variations, and thus applicable to uncontrolled open environments.

SUMMARY OF THE INVENTION

Accordingly, the present invention is directed to a dice recognition method and a dice recognition system, applicable in uncontrolled open environments.

Because of its robustness against illumination variations, the dice recognition system from the present invention can be applied on open table games, or customized for other applications in open or closed environments. The present invention provides a dice recognition system including a set of image capturing devices (for example, camera) and a computer server with an optional light shield and auxiliary lightings. The cameras connected with the computer server can be installed on any supports available on site. The optional light shield and auxiliary lightings can adjust the light casting on a plurality of dice. A plurality of dot images of the dice captured by the cameras from different viewpoints are delivered to the computer server, which has the dice recognition algorithm implemented in software for automatically reading of the number of dot on each dice.

The present invention provides a dice recognition method, which exploits the projections of a 3D dice onto the 2D image planes of the cameras with different viewpoints. In the dice recognition method, a set of the dot images from different viewpoints are captured by multiple image capturing devices. Next, a homography is exploited to each of the dot images to enhance features of a top surface of the dice and weaken those on the side surfaces, making the capture and segmentation of the top surface fast and accurate. The dots on the top surface are then searched for using a candidate search module. All of the searched dot candidates are confirmed by a dot classifier made by an artificial neural network. The spatial distributions of the confirmed dots are extracted by clustering so that dots close to each other are clustered into a dot cluster. Each spatial distribution is compared to a plurality of spatial distribution patterns (e.g. the six known spatial distribution patterns) to confirm the number of dot in each dot cluster.

According to an embodiment of the present invention, the aforementioned homography can establish the relationship between the projections of the same dice on the two different image planes made by the cameras with different viewpoints. The projection on one image plane can be mapped to the projection on the other via the homography transformation matrix, which is composed of internal and external parameters of the camera.

According to an embodiment of the present invention, the kernel of the present invention uses the homography obtained between each pair of the cameras to transform the image from one view to the other. Assuming that three dot images $I_A$, $I_B$, $I_C$ are from cameras A, B, C, respectively, and $H_{BA}$ and $H_{CA}$ are the homographies able to transform $I_B$ to $I_{BA}$ and $I_C$ to $I_{CA}$, respectively, stacking up $I_{BA}$, $I_{CA}$ and $I_A$, substantially enhances the contrast of the dots on the top surface and blurs the dots on the side surfaces of the dice shown in $I_A$. This stacking helps to segment the top surfaces of the dice. An edge-based circle detection scheme implemented in the kernel is then used to search for the dot candidates on the top surface.

According to an embodiment of the present invention, all of the dot candidates are verified by a dot classifier built in the kernel of the present invention. The dot classifier has been trained on a large collection of dots and non-dots, which are dot-like spots with appearances similar to dots, so that it can distinguish dots from non-dots. When a dot candidate is given, the dot classifier verifies whether it is a legitimate dot.

According to an embodiment of the present invention, the dots verified by the dot classifier are segmented according to the distances between the dots, and those with relatively close proximities are grouped into a dot cluster. The number of the dot cluster must be the same as the number of the dice, and each dot cluster must be associated with one-and-only dice. The number of the dot in each dot cluster gives an estimate to the number on the corresponding dice.

According to an embodiment of the present invention, after the estimate of the number on a dice is obtained using the corresponding dot cluster, the spatial distribution of the dots in the dot cluster will be checked against the spatial distribution patterns that the dots are expected to reveal. The spatial distribution of the dots on a dice surface follows one spatial distribution pattern for each of the six possible numbers appearing on the surface. When inconsistency happens, the corresponding dot cluster will be re-segmented with its neighboring clusters, and this process repeats until all dot clusters are consistent with one of the spatial distribution patterns. In case that a dot cluster is distributed in a way similar to a few spatial distribution patterns for the major part of it but with one dot missing or an additional dot, a similarity measure will be calculated based on the difference between the dot cluster and the similar patterns. The one with the highest similarity measure is considered as the pattern verified for the dot cluster.

Thereby, in the present invention, at least two cameras are required for capturing images of a dice from different viewpoints, and the images are transformed to render images with the same viewpoint to the top surface of the dice using homography. The transformed images are then stacked to each other to enhance the features of the dots on the top surface, and weaken the features on the side surfaces at the same time. Therefore the robustness against illumination variations across various uncontrolled environments can be built.

BRIEF DESCRIPTION OF THE DRAWINGS

The accompanying drawings are included to provide a further understanding of the present invention. The drawings illustrate embodiments of the invention and, together with the description, explain the principles of the present invention.

DESCRIPTION OF THE EMBODIMENTS

Figure 1A:
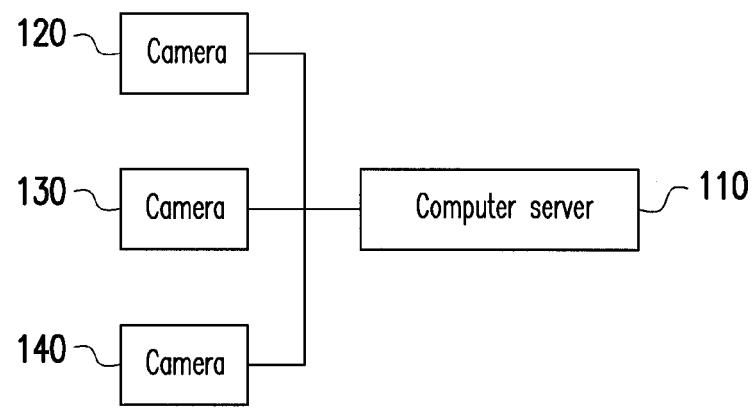
FIG. 1A is a block diagram of the dice recognition system according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

The present invention provides a dice recognition method and a dice recognition system for automatically recognizing the number of dot on a top surface of a dice. In order to make the content of the present invention clearer and more understandable, the embodiments of the present invention will be described in detail with reference to accompanying drawings.

FIG. 1A is a block diagram of a dice recognition system according to an embodiment of the present invention. For the convenience of description, the present embodiment will be described herein with three cameras. However, the present invention is not limited thereto, and in other embodiments, there may also be two or more than three cameras.

Referring to FIG. 1A, a computer server 110 is connected to the camera 120, the camera 130, and the camera 140, which take multiple images of the dice from different viewpoints for carrying out a dice recognition (the dice recognition process will be described in detail below). A dice recognition software in the computer server 110 includes a dice extraction module, a dot candidate search module, a dot classifier, a dot clustering module, and a distribution pattern verification module. The dice extraction module separates dice from the backgrounds. The dot candidate search module looks for regions whose edges appear to be circle alike, including real dots and other non-dot spots, which appear like dots but are not actual ones. The dot classifier module, built on a neural network, takes in dot candidates and verifies whether each dot candidate is a real dot. Given a set of dots verified by the dot classifier module, the dot clustering module will segment the whole set into n dot clusters, where n is the number of dice. Lastly, each dot cluster will be verified against one spatial distribution pattern associated with the number of dot in that cluster using the distribution pattern verification module. If the distribution fails to be verified, the dot clustering module will be used again to render a set of different dot clusters, and this process will repeat until all dot clusters are verified with their associated spatial distribution patterns.

Figure 1B:
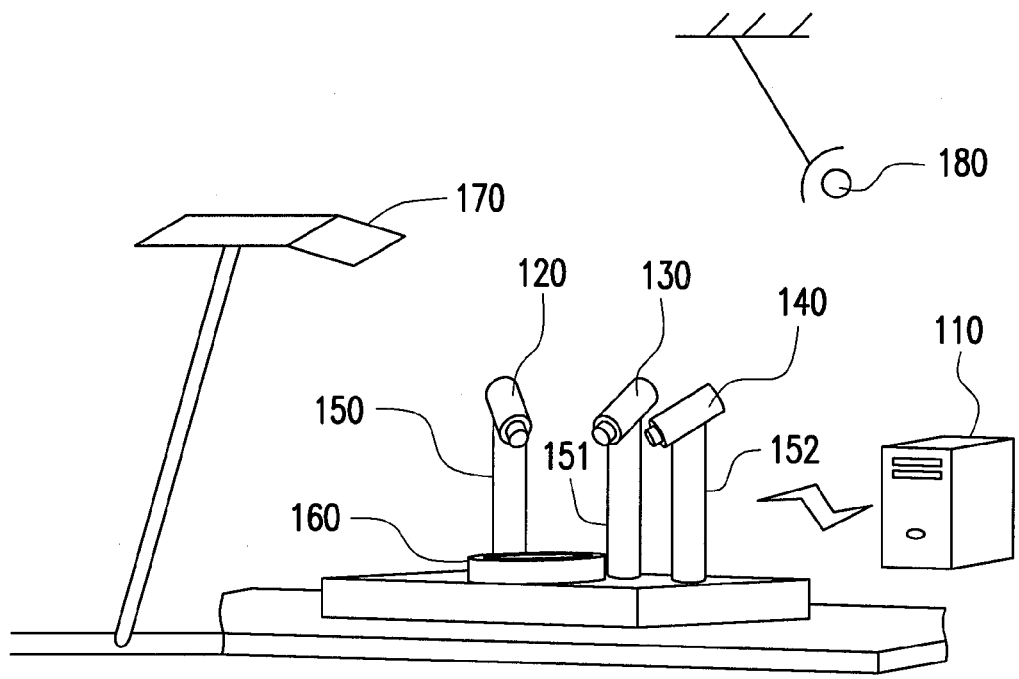
FIG. 1B is a schematic configuration of the dice recognition system according to an embodiment of the present invention.

FIG. 1B is a schematic configuration of the dice recognition system according to an embodiment of the present invention. Referring to FIG. 1B, the camera bracket 150, the camera bracket 151, and the camera bracket 152 are typical examples for mounting the camera 120, the camera 130, and the camera 140 with appropriate viewpoints so that these cameras can capture the dot images of the dice on the dice cup base 160. The computer server 110 obtains the captured dot images of the dice from these cameras, and processes these dot images using the dice extraction module, the dot candidate search module, the dot classifier, the dot clustering module, and the spatial distribution verification module in the recognition software installed in the computer server 110.

The camera bracket 150, the camera bracket 151, and the camera bracket 152 are typical examples for mounting the cameras, and they can be other types of camera supports available on site. The light shield 170 and the auxiliary light source 180 are optional items used for adjusting the ambient lighting conditions so that some extreme lighting conditions can be avoided and the dice recognition system can achieve its best performance.

The dice point recognition system in the present embodiment is applicable to uncontrolled environments, such as the popular table games in a casino. Using the present invention, an automatic open table dice games becomes feasible without the need of replacing existing setups and equipments, for example, the game tables and the dice cups. The present invention can also serve as an auxiliary system to the existing manually controlled table games that helps to confirm bankers' readings and prevent possible frauds. Because the present invention is robust to different illumination conditions, it can also be used for different designs of machine-controlled dice games, which have been emerging in recent years.

Figure 2:
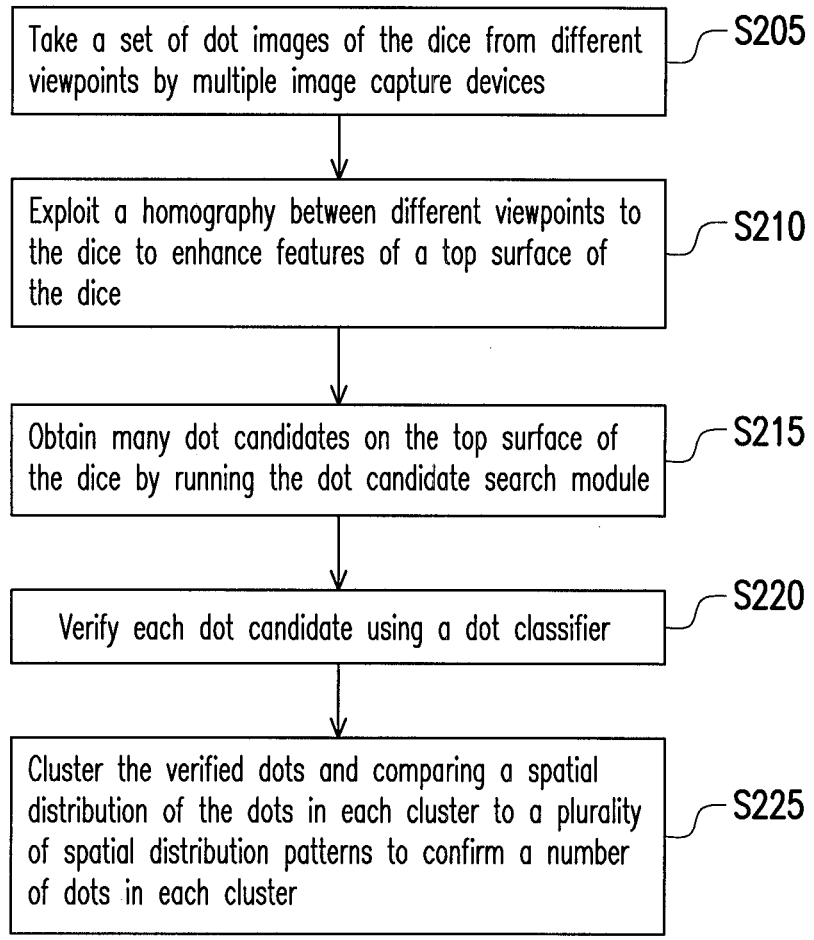
FIG. 2 is a flowchart of a dice recognition method according to an embodiment of the present invention.

Below, the dice recognition method executed by the computer server 110 will be described in detail with reference to an embodiment. FIG. 2 is a flowchart of a dice recognition method according to an embodiment of the present invention.

Referring to FIG. 2, in step S205, multiple image capturing devices (e.g. camera) are used for taking a set of dot images from different viewpoints. Then, in step S210, a homography is exploited to each of images of the dice to enhance the features of a top surface of the dice and weaken the features on side surfaces. Next, in step S215, many dot candidates on the top surface of the dice are obtained by running the dot candidate search module, which searches for the regions with edges shaped like circles. After that, in step S220, each dot candidate is verified using the dot classifier. Finally, in step S225, the verified dots are clustered and a spatial distribution of the dots in each cluster is compared to a plurality of spatial distribution patterns (e.g. six known spatial distribution patterns) to confirm the number of dot in each cluster.

Figure 3:
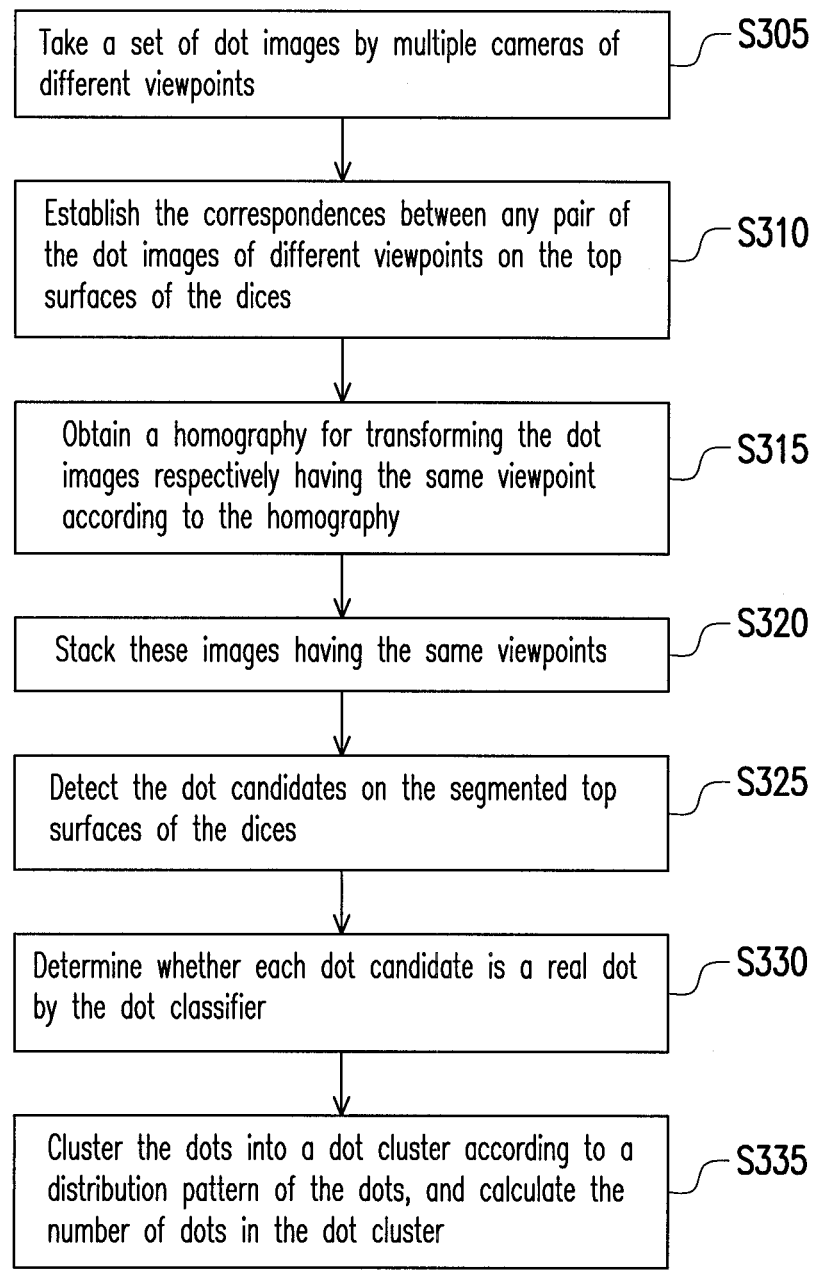
FIG. 3 is a flowchart of a dice recognition method according to another embodiment of the present invention.
Figure 4:
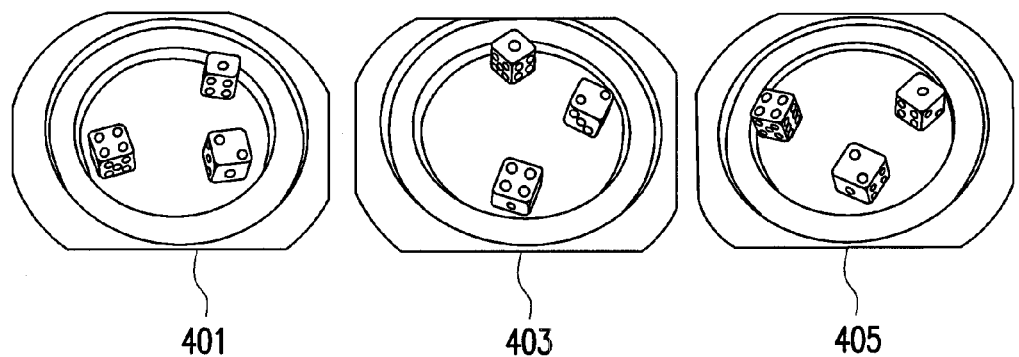
FIG. 4 is a diagram of a typical sample of dot images obtained from three cameras with different viewpoints according to an embodiment of the present invention.

The dice recognition method is further described with a different embodiment. FIG. 3 is a flowchart of the dice recognition method according to another embodiment of the present invention. Referring to FIG. 3, in step S305, a set of dot images are taken by multiple cameras of different viewpoints. The cameras 120, 130, and 140 in FIG. 1A and FIG. 1B capture three dot images of three dice from different viewpoints, as shown in FIG. 4. FIG. 4 is a diagram of a typical sample of the dot images obtained from three cameras with different viewpoints according to an embodiment of the present invention. Referring to FIG. 4, the dot image 401, the dot image 403, and the dot image 405 are captured from three cameras of different viewpoints.

In step S310, the correspondences between any pair of the dot images of different viewpoints are established on the top surfaces of the dice. Referring to both FIG. 1A and FIG. 4, when the computer server 110 receives the dot images captured by the cameras 120, 130, and 140, the matched correspondences between the dot images 401 and 403, between the dot images 401 and 405, and between the dot images 403 and 405 would be established.

Then, in step S315, for each pair of dot images, a homography, which transforms the dot images respectively having the same viewpoint, can be obtained by using the matched correspondences between them. That is to say, the homography can transform either image to the different viewpoint of the other. Because the homographies are based on the coplanar correspondences on the top surfaces of the dice, they can transform the coplanar regions of the dice in either image to the coplanar areas of the corresponding dice in the other image.

Figure 5:
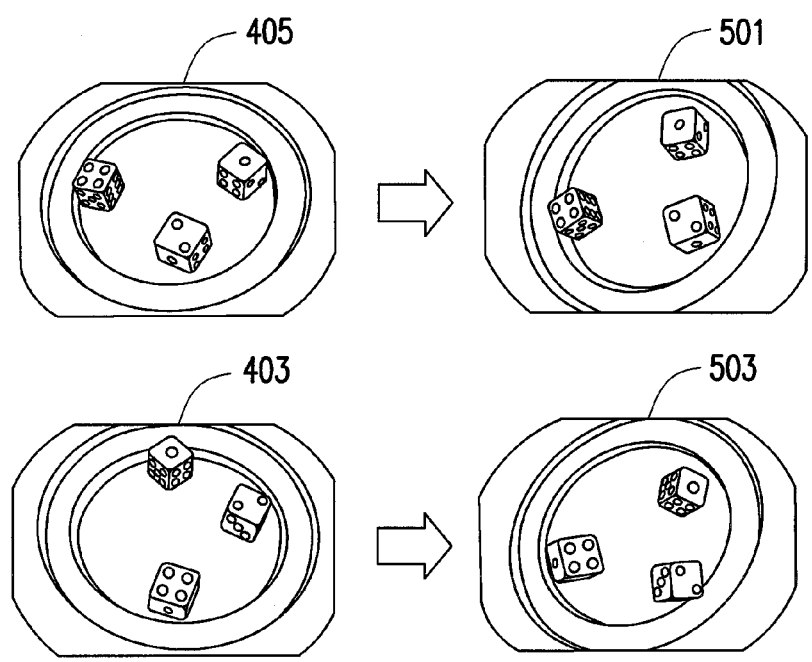
FIG. 5 is a diagram of two typical cases of transformed images via homography according to an embodiment of the present invention.

FIG. 5 is the diagram of two typical cases of transformed images via a homography according to an embodiment of the present invention. Referring to FIG. 4 and FIG. 5, the dot image 401 is selected as a reference image, and the dot images 403 and 405 are transformed to the viewpoint of the reference image (as shown by 401) using the homography between the dot images 403 and 401, and that between the dot images 405 and 401, respectively. As shown in FIG. 5, the dot image 405 is transformed to the dot image 501 which has the same viewpoint as that of 401, and the dot image 403 is transformed to the dot image 503 which again has the same viewpoint as that of 401.

Figure 6:
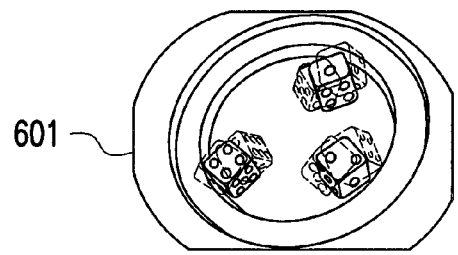
FIG. 6 is a diagram of a typical image stacked by two homography transformed dot images and the corresponding reference image according to an embodiment of the present invention.

Thereafter, the homography-transformed dot images and the corresponding reference image have the same viewpoints to the top surfaces of the dice and the same areas of the top surfaces shown in all three images. In step S320, these images having the same viewpoints are stacked for enhancing the features on the top surfaces and weaken the features on the side surfaces. It is because while almost all of the features on the top surfaces match to each other across the three images, there are still some features on the side surfaces matching to some other surfaces. This mismatch of the side surfaces is due to the fact that the homography is constructed using only the coplanar features of the top surfaces, and it cannot correctly transform the non-coplanar features on the side surfaces. FIG. 6 is a diagram of a typical image stacked by two homography-transformed dot images and the corresponding reference image according to an embodiment of the present invention. Referring to FIG. 6, the stacked image 601 is obtained by stacking the dot image 401 (as the reference image), the transformed dot images 501 and 503 shown in FIG. 5.

Figure 7:
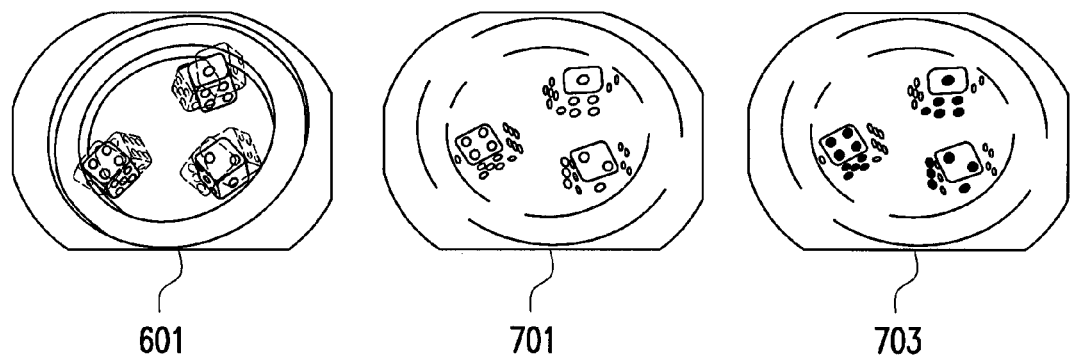
FIG. 7 is a diagram illustrating how to detect the dot candidates according to an embodiment of the present invention.

Next, in step S325, the dot candidates on the segmented top surfaces of the dices are detected. To detect the dot candidates, a Hough transform for detecting circles is designed and applied throughout the segmented top surfaces. FIG. 7 is a diagram illustrating how to detect the dot candidates according to an embodiment of the present invention. Referring to FIG. 7, the image 701 is the edge map of the stacked image 601 processed by edge detection, and the image 703 is obtained by running the Hough transform through the image 701. The black dots in the image 703 are the dot candidates.

Figure 8:
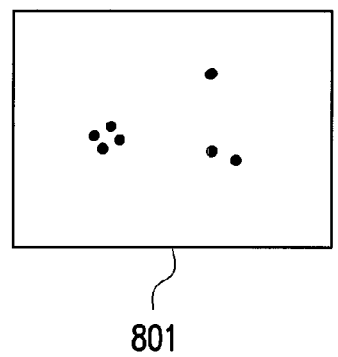
FIG. 8 is a diagram illustrating the dots on the top surfaces of the three dice recognized according to an embodiment of the present invention.

After that, in step S330, whether each dot candidate is a real dot is determined by the dot classifier. Namely, whether the dot candidates selected by the aforementioned Hough transform based circle detection are real dots are determined by the dot classifier. The dot classifier is made by an artificial neural network. The dot classifier is designed according to a CIE Lab color space, wherein the color space is highly tolerant to light source variations, thereby not being affected by any light source variation. Besides, a score is calculated for each dot candidate by using the dot classifier, and the score of each dot candidate is compared with a threshold, wherein when the score is greater than the threshold, the dot candidate corresponding to the score is determined to be the real dot. FIG. 8 is a diagram illustrating the dots on top surfaces of three dice recognized by the dot classifier according to an embodiment of the present invention. Referring to FIG. 8, the black dots in the dot image 801 are dots on the top surfaces of three dice.

Figure 9:
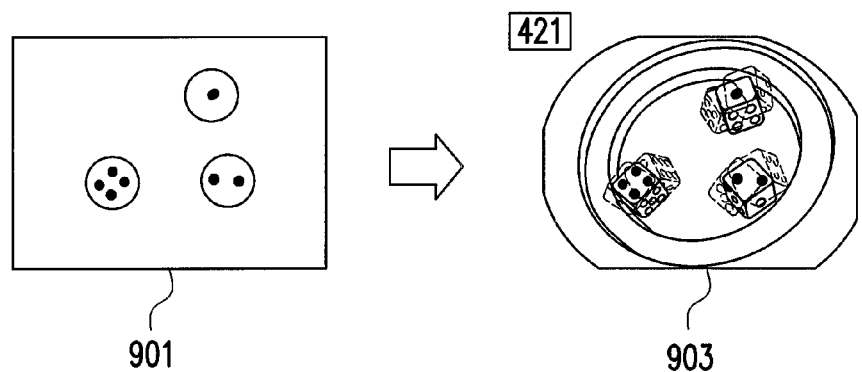
FIG. 9 is a diagram illustrating how the dots on the top surfaces of three dice are clustered according to an embodiment of the present invention.

In step S335, the dots are clustered into a dot cluster according to a distribution pattern of the dots, and the number of dot in the dot cluster is calculated. Namely, the number of dot is determined according to the dot clustering result. If there are more than one dice, those dot candidates that are determined to the real dots are first clustered before the number of dot is calculated (i.e., to distinguish dots of different dice). After that, the number of dot in each dot cluster is counted. FIG. 9 is a diagram illustrating how the dots on the top surfaces of three dice are clustered according to an embodiment of the present invention. Referring to FIG. 9, a recognizable dot cluster is defined according to the result of the dot classifier and the dot distribution pattern through automatic clustering. The clustered image 901 is obtained by performing the clustering process on the dot image 801. The recognition result image 903 is obtained by adding the dots into the stacked image 601.

Figure 10:
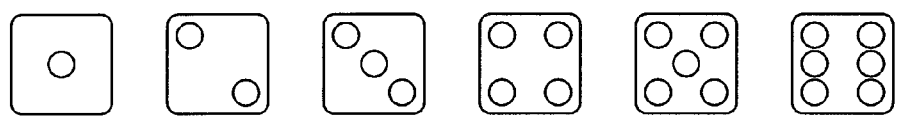
FIG. 10 is a diagram of the six dot distribution patterns according to an embodiment of the present invention.

In order to improve the recognition rate, after counting the number of dot in the dot cluster, whether the distribution of the dots in the dot cluster conforms to the dot distribution pattern is determined. FIG. 10 is a diagram of the six dot distribution patterns according to an embodiment of the present invention. In general, the dot distribution pattern on each surface of a six-sided dice is illustrated in FIG. 10. If the distribution of the dots in the dot cluster does not conform to the dot distribution pattern, one of the dot candidates closest to the dot cluster is selected as another dot and added into the dot cluster, and whether the distribution of the dots in the dot cluster conforms to the dice point distribution pattern is determined again. This process is repeated until the distribution of the dots in the dot cluster conforms to the dot distribution pattern.

In summary, in the embodiments described above, at least two image capturing devices are required for capturing dot images from different viewpoints, and a geometric space information of the dice is obtained through a computer stereo vision technique, so that a precise dice recognition can be carried out. In addition, besides the image capturing devices, a hood and a secondary light source are further adopted for adjusting the ambient light according to the on-site conditions, so as to allow the system to achieve an optimal dice recognition effects. Moreover, besides being applied to a controlled enclosed environment, the dice recognition system provided by the present invention may also be applied to an uncontrolled open environment. Thus, the dice recognition system in the present invention can be broadly applied to general gambling places. Furthermore, the original equipments (for example, the dice cup) in a general gambling place need not to be changed, and only at least two image capturing devices and a dice recognition software are required for carrying out the automatic dice recognition.

It will be apparent to those skilled in the art that various modifications and variations can be made to the structure of the present invention without departing from the scope or spirit of the invention. In view of the foregoing, it is intended that modifications and variations of this present invention falls within the scope of the following claims and their equivalents.

What is claimed is:

1. A dice recognition method, comprising:
   taking a set of dot images of the dice from different viewpoints by multiple image capturing devices;
   transforming each of the dot images of different viewpoints to dot images having a same viewpoint by exploiting a homography and stacking the dot images having the same viewpoint to form a stacked image, wherein features on a top surface of the dice are enhanced and features on side surfaces of the dice are weaken in the stacked image;
   obtaining a plurality of dot candidates on the top surface of the dice from the stacked image by running a dot candidate search module;
   verifying each of the dot candidates by using a dot classifier for recognizing whether each of the dot candidates is a real dot;
   clustering the verified dots for obtaining dot clusters; and
   comparing a spatial distribution of the dots in each of the dot clusters to a plurality of spatial distribution patterns to confirm the number of dots in each of the dot clusters.

2. The dice recognition method according to claim 1, wherein after the step of taking the dot images of the dice from the different viewpoints, the dice recognition method further comprises:
   establishing correspondences between any pair of the dot images of the different viewpoints on the top surface of the dice; and
   obtaining the homography by using the matched correspondences between the pair for transforming the dot images of the different viewpoints respectively to the dot images having the same viewpoint according to the homography.

3. The dice point recognition method according to claim 2, wherein the step of transforming the dot images of the different viewpoints respectively to the dot images having the same viewpoint according to the homography comprises:
   selecting a reference image from the dot images; and
   applying the homography to transform each of the other dot images from its current viewpoint to the viewpoint of the reference image.

4. The dice point recognition method according to claim 1, wherein after the step of confirming the number of dots in each of the dot clusters, the dice recognition method further comprises:
   whether the spatial distribution in each of the dot cluster conforms to one of the spatial distribution patterns;
   if the spatial distribution in one of the dot cluster does not conform to any one of the spatial distribution patterns, selecting one of the dot candidates closest to the dot cluster as another dot, adding the dot into the dot cluster, and re-determining whether the spatial distribution in the dot cluster conforms to one of the spatial distribution patterns, until the spatial distribution in the dot cluster conforms to one of the dot distribution patterns.

5. The dice recognition method according to claim 1, wherein the step of verifying each of the dot candidates by using the dot classifier for recognizing whether each of the dot candidates is the real dot comprises:
   designing the dot classifier according to a CIE Lab color space, and calculating a score for each of the dot candidates by using the dot classifier, wherein the color space is highly tolerant to light source variations;
   comparing the score of each of the dot candidates with a threshold; and
   when the score is greater than the threshold, determining that the dot candidate corresponding to the score is the real dot.

6. A dice recognition system, comprising:
   a set of image capturing devices, installed on any supports available on site, for capturing dot images of a plurality of dices from different viewpoints;
   an optional light, shield and auxiliary lightings for adjusting a light casting on the dices; and
   a computer server, for receiving the dot images from the image capturing devices, and implementing a dice recognition algorithm for automatically reading dots on each dice, the dice recognition algorithm comprising:
      exploiting a homography to each of the dot images for transforming each of the dot images of different viewpoints to dot images having a same view point and stacking the dot images having the same viewpoint to form a stacked image, wherein features on a top surface of the dice are enhanced and features on side surfaces of the dice are weaken in the stacked image;

obtaining a plurality of dot candidates on the top surface of each of the dices from the stacked image by running a dot candidate search module;

verifying each of the dot candidates by using a dot classifier for recognizing whether each of the dot candidates is a real dot;

clustering the verified dots for obtaining dot clusters; and comparing a spatial distribution of the dots in each of the dot clusters to a plurality of spatial distribution patterns to confirm the number of dots in each of the dot clusters.

7. The dice recognition system according to claim 6, wherein the computer server establishes correspondences between any pair of the dot images of the different viewpoints on the top surface of the device and exploits the homography obtained by using the matched correspondences between the pair of dot images for transforming the dot images having the different viewpoints respectively to the dot images having the same viewpoint.

8. The dice recognition system according to claim 7, wherein the computer server selects a reference image from the dot images and respectively transforms each of the other dot images from its current viewpoint to the viewpoint of the reference image according to the homography.

9. The dice recognition system according to claim 6, wherein the computer server determines whether the spatial distribution in each of the dot clusters conforms to one of the dot distribution patterns, if the spatial distribution in one of the dot clusters does not conform to any one of the spatial distribution patterns, the computer server selects one of the dot candidates closest to the dot cluster as another dot, adds the dot into the dot cluster, and re-determines whether the spatial distribution in the dot cluster conforms to one of the spatial distribution patterns, until the spatial distribution in the dot cluster conforms to one of the dot distribution patterns.

* * * * *